US011996074B2

(12) United States Patent
Tokozume et al.

(10) Patent No.: US 11,996,074 B2
(45) Date of Patent: May 28, 2024

(54) SIGNAL PROCESSING DEVICE AND SIGNAL PROCESSING DEVICE, AND SOUND DEVICE

(71) Applicant: SONY GROUP CORPORATION, Tokyo (JP)

(72) Inventors: Yuji Tokozume, Tokyo (JP); Yuki Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 25 days.

(21) Appl. No.: 17/763,406

(22) PCT Filed: Jun. 17, 2020

(86) PCT No.: PCT/JP2020/023838

§ 371 (c)(1),
(2) Date: Mar. 24, 2022

(87) PCT Pub. No.: WO2021/065095

PCT Pub. Date: Apr. 8, 2021

(65) Prior Publication Data

US 2022/0351711 A1 Nov. 3, 2022

(30) Foreign Application Priority Data

Oct. 3, 2019 (JP) ................................ 2019-182620

(51) Int. Cl.
*G10K 11/178* (2006.01)
*H04R 3/04* (2006.01)

(52) U.S. Cl.
CPC .. *G10K 11/17815* (2018.01); *G10K 11/17823* (2018.01); *G10K 11/17825* (2018.01);
(Continued)

(58) Field of Classification Search
None
See application file for complete search history.

(56) References Cited

U.S. PATENT DOCUMENTS 10,714,073 B1 * 7/2020 Rui .................. G10K 11/17823
2014/0141724 A1 5/2014 Liu et al.
(Continued)

FOREIGN PATENT DOCUMENTS

JP 06-282282 A 10/1994
JP 2008-116782 A 5/2008
(Continued)

OTHER PUBLICATIONS

International Search Report and Written Opinion of PCT Application No. PCT/JP2020/023838, dated Sep. 29, 2020, 09 pages of ISRWO.

*Primary Examiner* — Kenny H Truong
(74) *Attorney, Agent, or Firm* — CHIP LAW GROUP

(57) ABSTRACT

Provided is a signal processing device that performs noise canceling by combining a feedforward method and a feedback method. A signal processing device includes: a correlation calculation unit that calculates a correlation between a first sound pickup signal by a first microphone installed outside a predetermined region and a second sound pickup signal by a second microphone installed in the predetermined region; a determination unit that determines the correlation; and a control unit that performs control based on a result of the determination. The control unit controls execution of signal processing for generating a cancellation signal to be output within the predetermined region from the first sound pickup signal and the second sound pickup signal or output of the cancellation signal.

13 Claims, 7 Drawing Sheets

(52) U.S. Cl.
CPC ......... *G10K 11/17881* (2018.01); *H04R 3/04* (2013.01); *G10K 2210/3018* (2013.01); *G10K 2210/3026* (2013.01); *G10K 2210/3027* (2013.01); *G10K 2210/3044* (2013.01)

(56) References Cited

U.S. PATENT DOCUMENTS

2018/0018954 A1 1/2018 Liu et al.
2018/0122359 A1 5/2018 Liu et al.

FOREIGN PATENT DOCUMENTS

JP 2014-507894 A 3/2014
JP 2017-518522 A 7/2017

* cited by examiner

SIGNAL PROCESSING DEVICE AND SIGNAL PROCESSING DEVICE, AND SOUND DEVICE

CROSS REFERENCE TO RELATED APPLICATIONS

This application is a U.S. National Phase of International Patent Application No. PCT/JP2020/023838 filed on Jun. 17, 2020, which claims priority benefit of Japanese Patent Application No. JP 2019-182620 filed in the Japan Patent Office on Oct. 3, 2019. Each of the above-referenced applications is hereby incorporated herein by reference in its entirety.

TECHNICAL FIELD

Technology disclosed in the present specification (hereinafter, also referred to as "the present disclosure") relates to a signal processing device and a signal processing device, a computer program, and a sound device that process an audio signal.

BACKGROUND ART

Noise canceling (NC) is technology that makes it difficult to hear, in a specific region (hereinafter, also referred to as an "NC region"), an external sound such as a noise generated outside the NC region. The noise canceling technology is applied to, for example, audio headphones and earphones. The noise canceling is generally realized by a combination of passive noise canceling and active noise canceling. The passive noise canceling is realized by maintaining a sound insulation property of the NC region with an ear pad or the like. According to the passive noise canceling, it is possible to cancel a middle range to a high range of the external sound, but it is not possible to sufficiently cancel a low range. Therefore, a sound having an opposite phase to the external sound is generated by the active noise canceling to cancel the external sound, thereby canceling the low range to the middle range of the external sound.

Furthermore, examples of the active noise canceling include a "feedforward method" that cancels an external sound in an NC region using a signal having an opposite phase to a signal picked up by a microphone (hereinafter, also referred to as a "feedforward (FF) microphone") installed outside the NC region, and a "feedback method" that cancels an external sound in the NC region using a signal having an opposite phase to a signal picked up by a microphone (hereinafter, also referred to as a "feedback (FB) microphone") installed in the NC region (see, for example, Patent Document 1). Hereinafter, simply referring to "noise canceling" in the present specification basically refers to the active noise canceling.

CITATION LIST

Patent Document

Patent Document 1: Japanese Patent Application Laid-Open No. 2008-116782

SUMMARY OF THE INVENTION

Problems to be Solved by the Invention

An object of the technology according to the present disclosure is to provide a signal processing device and a signal processing device, a computer program, and a sound device that perform noise canceling.

Solutions to Problems

Technology according to the present disclosure has been made in view of the problems described above, and a first aspect thereof is a signal processing device including:

a correlation calculation unit that calculates a correlation between a first sound pickup signal by a first microphone installed outside a predetermined region and a second sound pickup signal by a second microphone installed in the predetermined region;

a determination unit that determines the correlation; and a control unit that performs control based on a result of the determination.

The signal processing device according to the first aspect further includes a processing unit that performs signal processing for generating a cancellation signal to be output within the predetermined region on the basis of the first sound pickup signal and the second sound pickup signal. The processing unit basically generates a first cancellation signal for canceling an external sound leaking into the predetermined region on the basis of the first sound pickup signal, and generates a second cancellation signal for canceling a sound left uncanceled by the first cancellation signal on the basis of the second sound pickup signal.

Then, the determination unit determines whether or not the correlation is equal to or less than a predetermined threshold, and in a case where it is determined that the correlation is equal to or less than the threshold, the control unit stops the generation processing of the cancellation signal by the processing unit or stops the output of the generated cancellation signal, or reduces the output of the cancellation signal.

Alternatively, the determination unit determines whether or not the correlation exceeds a predetermined threshold, and in a case where it is determined that the correlation exceeds the threshold, the control unit performs the generation processing of the cancellation signal by the processing unit and causes to perform the output the generated cancellation signal.

Furthermore, a second aspect of the technology according to the present disclosure is a signal processing method including:

a correlation calculation step of calculating a correlation between a first sound pickup signal by a first microphone installed outside a predetermined region and a second sound pickup signal by a second microphone installed in the predetermined region;

a determination step of determining the correlation; and a control step of performing control based on a result of the determination.

Furthermore, a third aspect of the technology according to the present disclosure is a computer program described in a computer-readable form so that a computer functions as:

a correlation calculation unit that calculates a correlation between a first sound pickup signal by a first microphone installed outside a predetermined region and a second sound pickup signal by a second microphone installed in the predetermined region;

a determination unit that determines the correlation; and a control unit that performs control based on a result of the determination.

A computer program according to the third aspect defines a computer program described in a computer readable form so as to realize predetermined processing on a computer. In other words, by installing the computer program according to the third aspect in the computer, a cooperative action is exerted on the computer, and it is possible to obtain action and effect similar to those of the signal processing device according to the first aspect.

Furthermore, a fourth aspect of the technology according to the present disclosure is a sound device including:

a first microphone installed outside a predetermined region;

a second microphone installed in the predetermined region;

a reproduction unit that outputs audio within the predetermined region;

a processing unit that performs signal processing for generating a cancellation signal to be output from the reproduction unit on the basis of a first sound pickup signal by the first microphone and a second sound pickup signal by the second microphone; and a control unit that controls execution of generation processing of the cancellation signal in the processing unit or output of the cancellation signal on the basis of a correlation between the first sound pickup signal and the second sound pickup signal.

Effects of the Invention

According to the technology of the present disclosure, it is possible to provide a signal processing device and a signal processing device, a computer program, and a sound device that perform noise canceling by combining a feedforward method and a feedback method.

Note that effects described in the present specification are merely examples, and the effects brought about by the technology according to the present disclosure are not limited thereto. Furthermore, there is also a case where the technology according to the present disclosure exerts additional effects in addition to the effects described above.

Still other objects, features, and advantages of the technology according to the present disclosure will be clarified by more detailed description based on embodiments and accompanying drawings as described later.

MODE FOR CARRYING OUT THE INVENTION

Hereinafter, embodiments of the technology according to the present disclosure will be described in detail with reference to the drawings.

Embodiment 1

Figure 1:
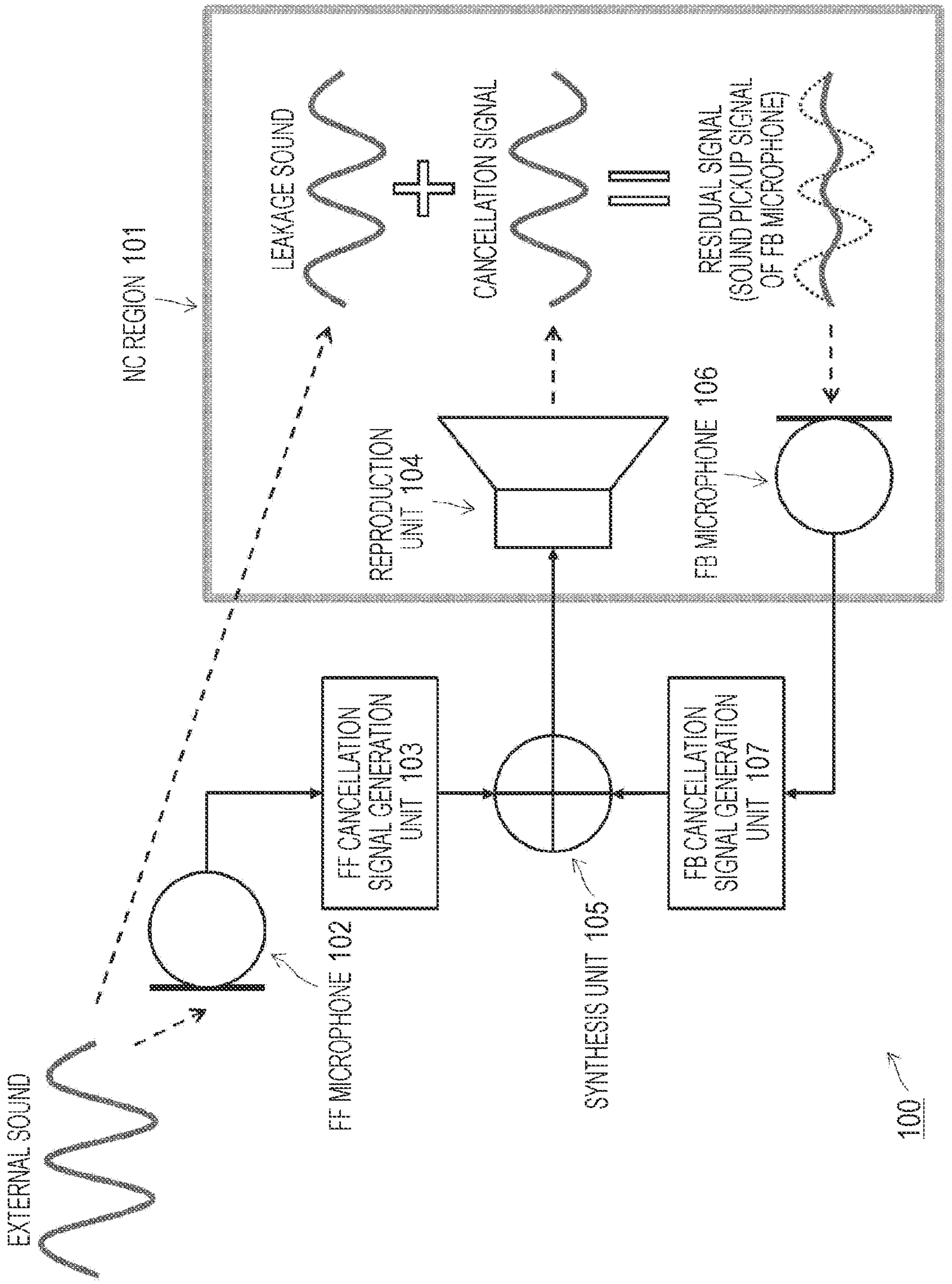
FIG. 1 is a diagram illustrating a configuration example of a noise canceling system 100.

A basic principle of noise canceling is to pick up external sound, analyze a signal by a noise canceling circuit, generate a sound having an opposite phase that cancels the analyzed external sound, and superimpose the original external sound and the sound having the opposite phase to reduce the external sound. FIG. 1 schematically illustrates a configuration example of a noise canceling system 100 combining a feedforward method and a feedback method according to a first embodiment.

The noise canceling system 100 is assumed to be applied to, for example, audio headphones and earphones, but is not necessarily limited thereto. An NC region 101 is a target region where noise canceling is performed. For example, in a case where the noise canceling system 100 is applied to headphones, the NC region 101 corresponds to a space between an ear of a wearer and a headphone housing, and an ear canal entrance is shielded by an ear pad or the like.

The noise canceling system 100 illustrated in FIG. 1 includes a feedforward (FF) microphone 102, an FF cancellation signal generation unit 103, a reproduction unit 104, a synthesis unit 105, a feedback (FB) microphone 106, and an FB cancellation signal unit 107.

It is assumed that an external sound such as a noise generated outside the NC region 101 leaks into the NC region 101. In a case where the headphones are playing music, the wearer of the headphones is bothered by the external sound leaking into the NC region 101, and it becomes difficult to listen to the music. Therefore, the FF microphone 102 is installed outside the NC region 101, and attempts to pick up an external sound generated outside the NC region 101. Then, the FF cancellation signal generation unit 103 analyzes a signal picked up by the FF microphone 102 and generates an FF cancellation signal having an opposite phase to cancel the analyzed external sound.

The reproduction unit 104 includes an acoustic element such as a speaker installed in the NC region 101, and audio-outputs an FF cancellation signal in the NC region 101. Note that in a case where the headphones are playing music, the FF cancellation signal is synthesized with a music signal in the synthesis unit 105, and the reproduction unit 104 outputs an audio signal after synthesizing the music signal and the FF cancellation signal.

With this arrangement, the external sound leaking into the NC region 101 and the FF cancellation signal reproduced from the reproduction unit 104 cancel each other, and it is difficult to hear the external sound in the NC region 101. In a case where the headphones are playing music, the external sound is canceled in the NC region 101, and it is easy to listen to the music.

Furthermore, the FB microphone 106 is installed inside the NC region 101. It is difficult to completely cancel the external sound leaking into the NC region 101 only by the FF cancellation signal, and there is a case where the external sound is left uncanceled. The FB microphone 106 picks up the residual sound left uncanceled. Then, the FB cancellation signal generation unit 107 analyzes a signal picked up by the FB microphone 106, and generates an FB cancellation signal having an opposite phase to cancel the analyzed residual sound.

The FB cancellation signal is synthesized with the FF cancellation signal in the synthesis unit 105. In a case where the headphones are playing music, the FB cancellation signal is synthesized with the music signal together with the FF cancellation signal in the synthesis unit 105. The reproduction unit 104 outputs an audio signal obtained by synthesizing the FB cancellation signal and the FF cancellation signal.

With this arrangement, the external sound left uncanceled by the FF cancellation signal and the FB cancellation signal cancel each other, and it is further difficult to hear the external sound in the NC region 101. Therefore, in a case where the headphones are playing music, the external sound is canceled by the FF cancellation signal and the external sound left uncanceled is canceled by the FB cancellation signal, so that it is easier to listen to the music in the NC region 101. That is, accuracy of noise canceling can be further enhanced by combining the FB method with the FF method. Then, by noise canceling processing combining the FF method and the FB method, for example, the wearer of the headphones can listen to the music without being bothered by the external sound.

Note that all or a part of the FF cancellation signal generation unit, the FB cancellation signal generation unit 107, the reproduction unit 104, and the synthesis unit 105 can be configured by large scale integration (LSI) for signal processing such as a digital signal processor (DSP).

Figure 2:
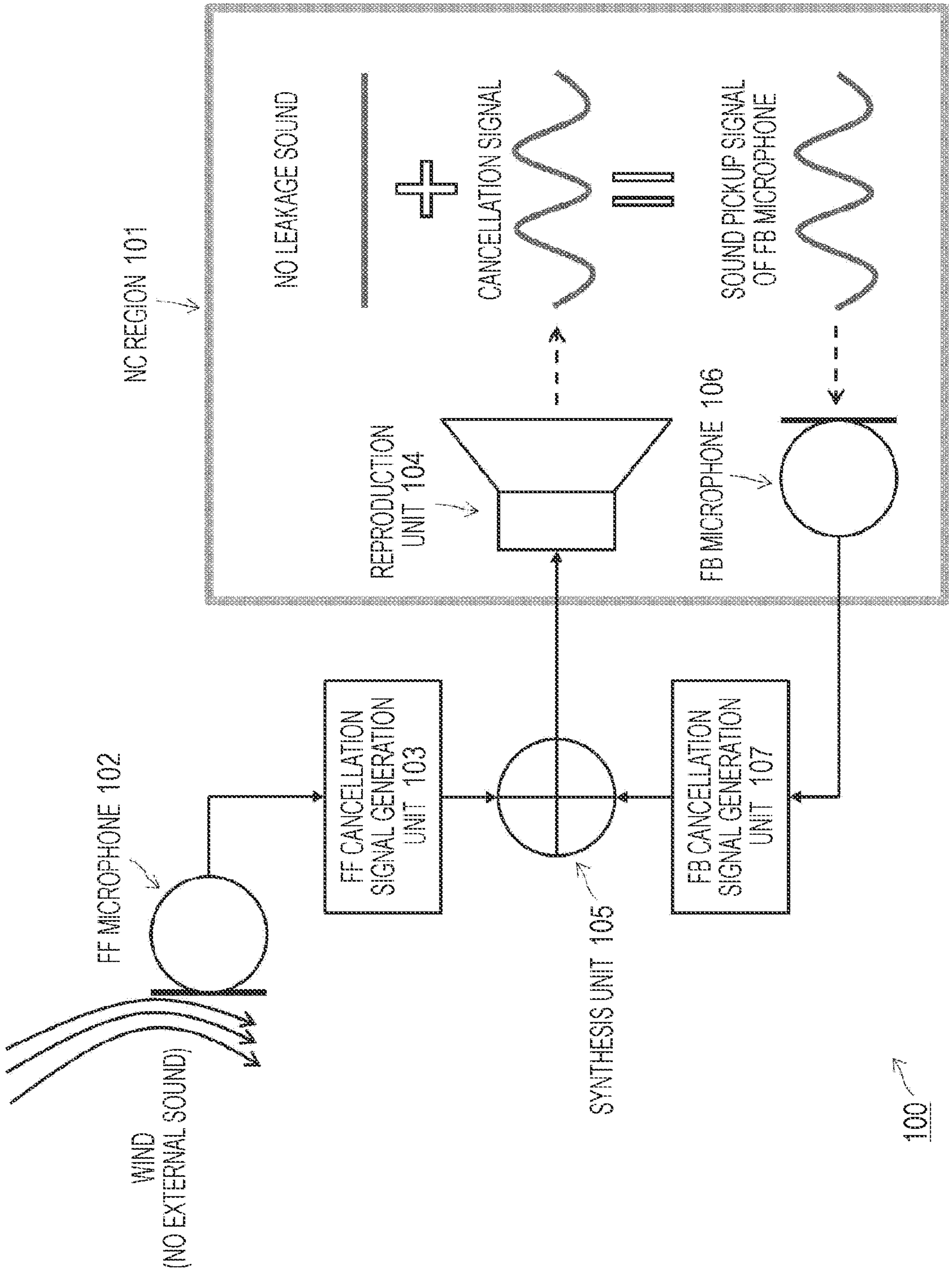
FIG. 2 is a diagram for explaining an operation example of the noise canceling system 100.

In the description described above, it is based on the premise that the sound picked up by the FF microphone 102 leaks into the NC region 101. However, it is also assumed that the FF microphone 102 picks up a sound that does not leak into the NC region 101. For example, as illustrated in FIG. 2, if headphones are used under a strong wind, a large sound due to turbulence is generated on a surface and inside of the FF microphone 102 due to the strong wind, and the FF microphone 102 picks up the sound. However, the sound due to such turbulence does not leak into the NC region 101.

If the FF cancellation signal generation unit 103 audio-outputs an FF cancellation signal generated on the basis of a signal picked up by the FF microphone 102 in the NC region 101 in a state where there is no leakage sound, the FF cancellation signal becomes noise. For example, the wearer of the headphones directly hears the FF cancellation signal, which causes discomfort.

Furthermore, in such a case, the FB microphone 106 picks up the FF cancellation signal itself instead of an uncanceled sound. Then, the FB cancellation signal generation unit 107 generates an FB cancellation signal having an opposite phase to the FF cancellation signal. As a result, a signal obtained by synthesizing the FF cancellation signal and the FB cancellation signal in the synthesis unit 105 is audio-output into the NC region 101 by the reproduction unit 104. Since the FF cancellation signal and the FB cancellation signal are synthesized, magnitude of the cancellation signal to be audio-output is reduced, but the wearer of the headphones will still feel uncomfortable.

Furthermore, in addition to the strong wind, the FF microphone 102 picks up a sound that does not leak into the NC region 101, such as a contact sound made by a finger, hair, or the like to the FF microphone 102, and an FF cancellation signal is generated and audio-output to the NC region 101, thereby giving discomfort to the wearer of the headphones. If noise canceling is performed in a case where the sound is generated on the surface or inside of the FF microphone 102, there is a possibility that discomfort is given to the wearer of the headphones.

Therefore, in the technology according to the present disclosure, if the FF microphone 102 picks up a sound that does not leak into the NC region 101, an unnecessary or harmful cancellation signal is prevented from being wastefully generated. According to the technology of the present disclosure, the noise canceling system 100 controls operation of noise canceling processing on the basis of a correlation between a signal picked up by the FF microphone 102 and a signal picked up by the FB microphone 106.

The FF microphone 102 installed outside the NC region 101 picks up an external sound generated outside the NC region 101, the FF cancellation signal generation unit 103 generates an FF cancellation signal having an opposite phase to the external sound, and the reproduction unit 104 audio-outputs the FF cancellation signal in the NC region 101. With this arrangement, the external sound leaking into the NC region 101 and the FF cancellation signal output from the reproduction unit 104 cancel each other. On the other hand, the FB microphone 106 installed in the NC region 101 picks up a sound remaining after cancellation by the FF cancellation signal in the NC region 101.

Normally (or in a state where noise canceling is normally performed), a signal picked up by the FF microphone 102 and a signal picked up by the FB microphone 106 have a correlation close to 0 or a positive correlation. In a case where the external sound leaking into the NC region 101 can be completely canceled by the FF cancellation signal, a correlation between the signal picked up by the FF microphone 102 and the signal picked up by the FB microphone 106 is 0. Furthermore, in a case where it is not completely canceled and an uncanceled state occurs, the correlation becomes positive.

The "correlation" between the signal picked up by the FF microphone 102 and the signal picked up by the FB microphone 106 may be an inner product value of cut-out signals when these two signals are cut out only for the same time section. For example, a correlation between two signals $a=(a_1, a_2, \ldots, a_N)$ and $b=(b_1, b_2, \ldots, b_N)$ may be, for example, an inner product value expressed by the following formula (1).

[Mathematical formula 1]

$$\sum_{i=1}^{N} a_i b_i \quad (1)$$

In a case where the external sound leaking into the NC region 101 can be completely canceled by the FF cancellation signal, a correlation between the signal picked up by the FF microphone 102 and the signal picked up by the FB microphone 106 is 0. Furthermore, in a case where it is not completely canceled and an uncanceled state occurs, the correlation becomes positive. In summary, in a case where the external sound leaking into the NC region 101 is picked up by the FF microphone 102 and canceled by the FF cancellation signal, the correlation between the signal picked up by the FF microphone 102 and the signal picked up by the FB microphone 106 is positive or 0.

On the other hand, if the headphones are used under a strong wind, a large sound due to turbulence is generated on the surface and inside of the FF microphone 102 due to the strong wind, and the FF microphone 102 picks up the sound. However, the sound due to such turbulence does not leak into the NC region 101. If the FF cancellation signal generation unit 103 audio-outputs an FF cancellation signal generated on the basis of a signal picked up by the FF microphone 102 in the NC region 101 in a state where there is no leakage sound, the FB microphone 106 picks up the FF cancellation signal. Therefore, the correlation between the signal picked up by the FF microphone 102 and the signal picked up by the FB microphone 106 is negative. Note that the FB cancellation signal generated by the FB cancellation signal generation unit 107 on the basis of the signal picked up by the FB microphone 106 is audio-output together with the FF cancellation signal in the NC region 101, so that a negative degree of the correlation is reduced, but the correlation is still negative. Besides the strong wind, in a case where the FF microphone 102 picks up a sound that does not leak into the NC region 101, such as contact sound made by a finger, hair, or the like to the FF microphone 102, a correlation between a signal picked up by the FF microphone 102 and a signal picked up by the FB microphone 106 is similarly negative.

Therefore, in the technology according to the present disclosure, the correlation between the signal picked up by the FF microphone 102 and the signal picked up by the FB microphone 106 is continuously calculated, and if the correlation falls below a predetermined threshold, it is determined that the FF microphone 102 has picked up a sound that does not leak into the NC region 101. The threshold is preferably set to 0 or less. Then, if it is determined that the FF microphone 102 has picked up the sound that does not leak into the NC region 101, control of the noise canceling processing, such as stopping output of the cancellation signal or reducing output (amplitude) of the cancellation signal, is performed for a certain period of time. With this arrangement, it is possible to prevent the wearer of the headphones from feeling discomfort caused by directly listening to the FF cancellation signal and discomfort that remains even if the FF cancellation signal and the FB cancellation signal are synthesized from each other.

Note that the correlation between the two signals $a=(a_1, a_2, \ldots, a_N)$ and $b=(b_1, b_2, \ldots, b_N)$ may be a Pearson's correlation coefficient expressed by the following formula (2) or a cosine similarity expressed by the following formula (3), in addition to the inner product value.

[Mathematical formula 2]

$$\frac{\sum_{i=1}^{N}(a_i-\bar{a})(b_i-\bar{b})}{\sqrt{\sum_{i=1}^{N}(a_i-\bar{a})^2}\sqrt{\sum_{i=1}^{N}(b_i-\bar{b})^2}} \tag{2}$$

wherein $\bar{a}$ and $\bar{b}$ are average values of a and b, respectively.

[Mathematical formula 3]

$$\frac{\sum_{i=1}^{N}a_ib_i}{\sqrt{\sum_{i=1}^{N}a_i^2}\sqrt{\sum_{i=1}^{N}b_i^2}} \tag{3}$$

Furthermore, before the correlation between the sound pickup signal of the FF microphone 102 and the sound pickup signal of the FB microphone 106 is calculated, some signal processing may be performed on each sound pickup signal. For example, in a case where there is music reproduction, a music signal output from the reproduction unit is picked up by the FB microphone 106, which affects the correlation between the sound pickup signal of the FF microphone 102 and the sound pickup signal of the FB microphone 106, and makes it difficult to detect a strong wind or a contact sound to the FF microphone 102. Therefore, in a case where there is music reproduction, the correlation calculation may be performed after performing signal processing to reduce an influence of the music signal.

As an example of the signal processing for reducing the influence of the music signal, application of a low-pass filter can be mentioned. By applying the low-pass filter, only low-frequency components that are less included in the music signal can be used for calculating the correlation. Furthermore, by applying the low-pass filter, there is also an effect that high-frequency noise affecting a correlation value can be removed.

Furthermore, as another example of the signal processing for reducing the influence of the music signal, there is "music cancellation" technology for removing a music component from the sound pickup signal of the FB microphone 106 on the basis of a known music signal output from the reproduction unit 104.

Figure 3:
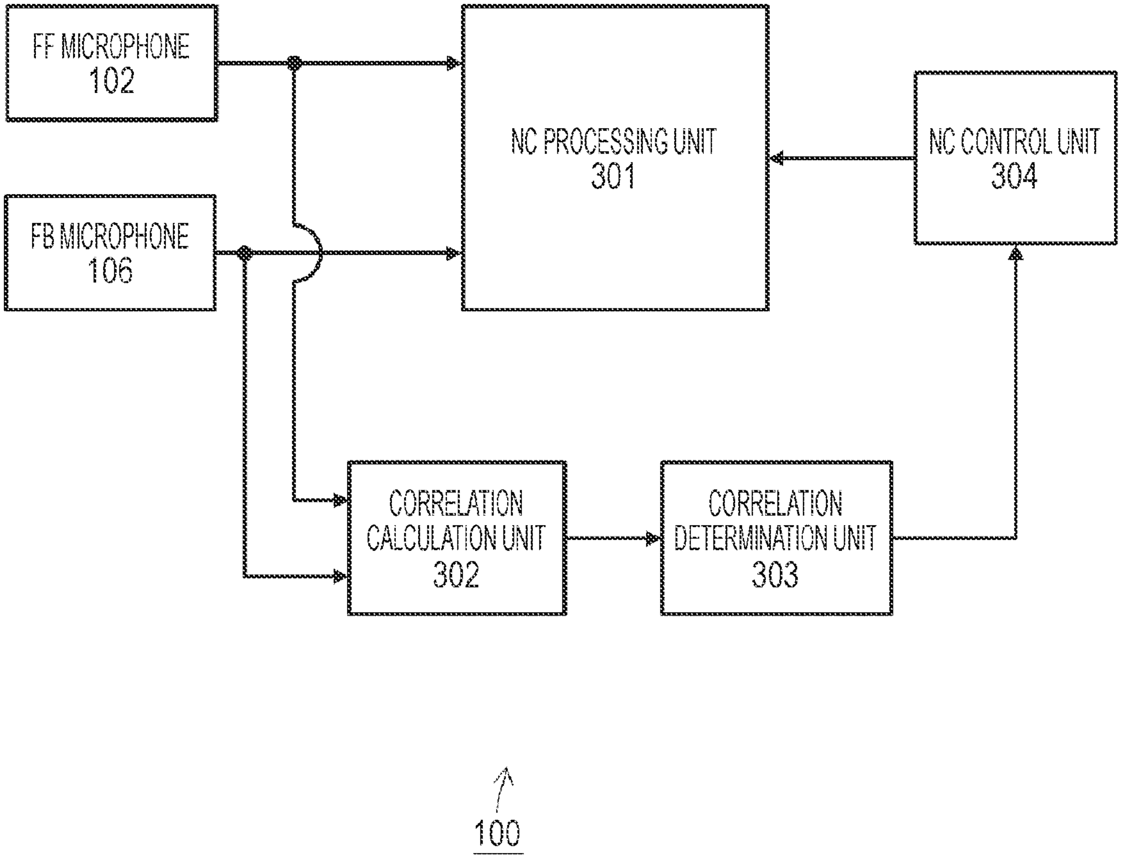
FIG. 3 is a block diagram illustrating a functional configuration for implementing signal processing in the noise canceling system 100.

FIG. 3 illustrates a functional configuration for implementing signal processing in the noise canceling system 100 according to the present embodiment.

A noise canceling processing unit 301 performs signal processing for generating a cancellation signal to be output from the reproduction unit 104 (not illustrated in FIG. 3) in the NC region 101 on the basis of a sound pickup signal by the FF microphone 102 and a sound pickup signal by the FB microphone 106.

Basically, the noise canceling processing unit 301 is equipped with functions of the FF cancellation signal generation unit 103 and the FB cancellation signal generation unit 107, and generates an FF cancellation signal for canceling an external sound leaking into the NC region 101 on the basis of the sound pickup signal of the FF microphone 102, and generates an FB cancellation signal for canceling a sound left uncanceled by the FF cancellation signal on the basis of the sound pickup signal of the FB microphone 106.

A correlation calculation unit 302 calculates a correlation between a signal picked up by the FF microphone 102 and a signal picked up by the FB microphone 106. The correlation calculation unit 302 may calculate the correlation using, for example, any of an inner product value, a Pearson's correlation coefficient, or a cosine similarity. It is assumed that the correlation calculation unit 302 calculates the correlation between the two signals according to a definitional equation that is 0 when there is no correlation. This is because by adding an offset to the correlation definitional equation, and equivalent processing can be performed by setting a threshold to 0 or more.

A correlation determination unit 303 determines a correlation between a signal picked up by the FF microphone 102 and a signal picked up by the FB microphone 106. As described above, in a case where the external sound leaking into the NC region 101 is picked up by the FF microphone 102 and is canceled by the FF cancellation signal, and the remaining external sound is canceled by the FB cancellation signal, the correlation between the signal picked up by the FF microphone 102 and the signal picked up by the FB microphone 106 is positive or 0. On the other hand, in a case where the FF microphone 102 picks up a sound that does not leak into the NC region 101, the correlation is negative. Therefore, the correlation determination unit 303 sets a threshold of 0 or less, and determines that the FF microphone 102 has picked up the sound that does not leak into the NC region 101 if the correlation falls below the threshold.

A noise canceling control unit 304 controls generation processing of a cancellation signal by the noise canceling processing unit 301 or output of the generated cancellation signal on the basis of a determination result by the correlation determination unit 303.

If noise canceling processing is performed in a case where the FF microphone 102 picks up a sound that does not leak into the NC region 101, for example, a wearer of headphones directly hears the FF cancellation signal, which causes discomfort. Furthermore, even if the cancellation signal output by synthesizing the FF cancellation signal and the FB cancellation signal becomes small, the wearer of the headphones still feels uncomfortable (described above).

Therefore, in the present embodiment, if the correlation determination unit 303 determines that the correlation calculated by the correlation calculation unit 302 is equal to or less than the predetermined threshold, in other words, in a case where the FF microphone 102 picks up a sound that does not leak into the NC region 101, the noise canceling control unit 304 stops the generation processing of the cancellation signal by the noise canceling processing unit 301 or stops the output of the generated cancellation signal, or reduces the output of the cancellation signal for a certain period of time. With this arrangement, it is possible to prevent the wearer of the headphones from feeling discomfort caused by directly listening to the FF cancellation signal and discomfort that remains even if the FF cancellation signal and the FB cancellation signal are synthesized from each other.

Alternatively, if the correlation determination unit 303 determines that the correlation calculated by the correlation calculation unit 302 exceeds the predetermined threshold, in other words, in a case where the external sound is canceled by the FF cancellation signal and the remaining external sound is further canceled by the FB cancellation signal, the noise canceling control unit 304 may perform the generation processing of the cancellation signal by the noise canceling processing unit 301 or perform the output of the generated cancellation signal for a certain period of time. With this arrangement, unnecessary or harmful noise canceling processing is not wastefully performed, whereby discomfort is not given to wearing of the headphones, and the noise canceling processing is appropriately activated in a situation where the external sound leaks into the NC region 101, so that the wearer of the headphones can easily listen to a music signal. In addition, the cancellation signal may be enhanced according to magnitude of the correlation, or algorithm of the noise canceling processing may be switched according to the magnitude of the correlation.

Figure 4:
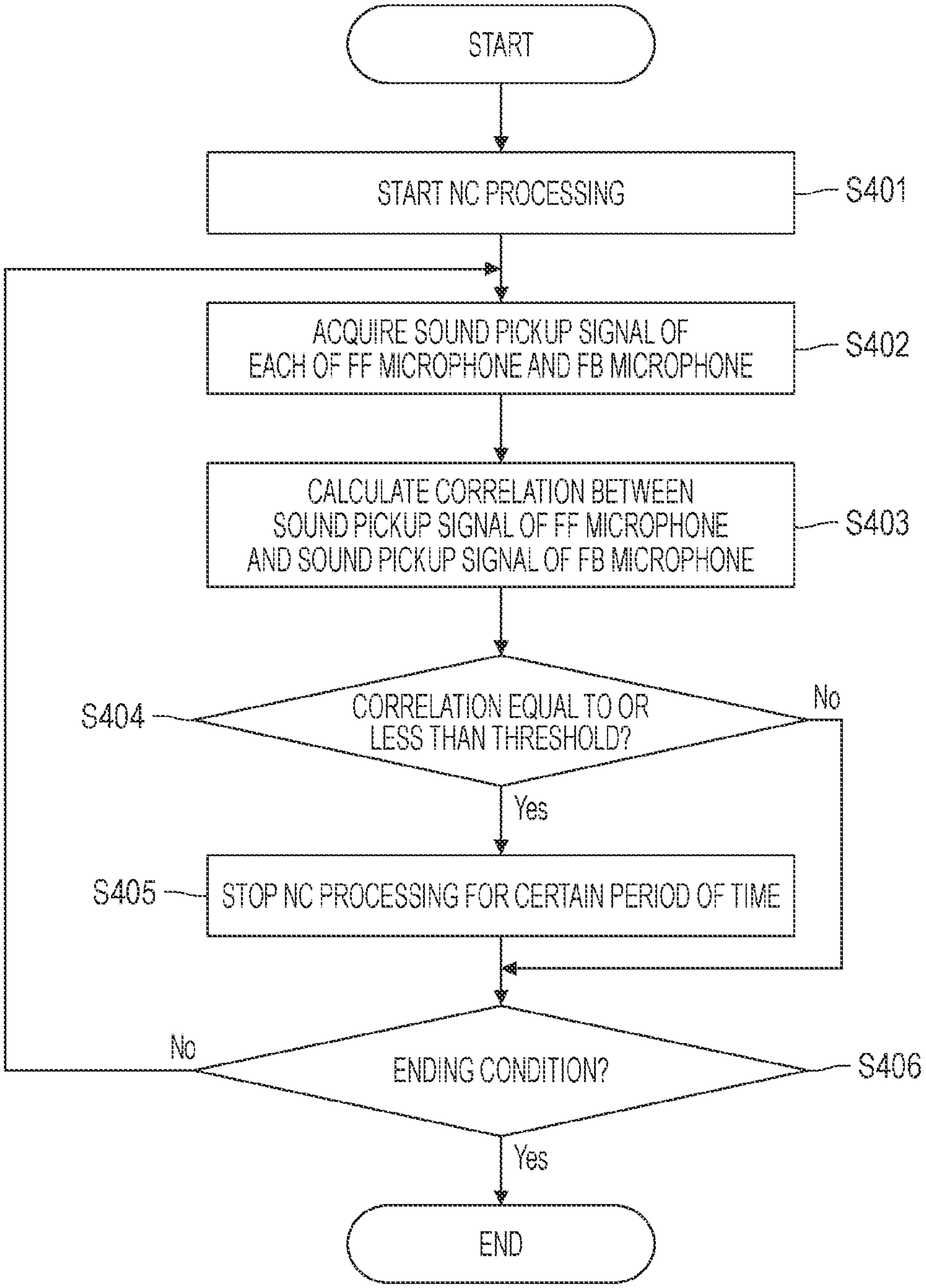
FIG. 4 is a flowchart illustrating a processing procedure for noise canceling performed in the noise canceling system 100.

FIG. 4 illustrates a processing procedure for noise canceling performed in the noise canceling system 100 having the functional configuration illustrated in FIG. 3 in the form of a flowchart.

When noise canceling processing is started in the noise canceling system 100 (step S401), first, a sound pickup signal of each of the FF microphone 102 and the FB microphone 106 is acquired (step S402).

Next, the correlation calculation unit 302 calculates a correlation between the signal picked up by the FF microphone 102 and the signal picked up by the FB microphone 106 (step S403). Note that the correlation calculation unit 302 may perform signal processing for reducing an influence of a music signal, such as a low-pass filter or music cancellation, before the correlation calculation.

Then, the correlation determination unit 303 checks whether the correlation between the signal picked up by the FF microphone 102 and the signal picked up by the FB microphone 106 is equal to or less than a predetermined threshold (step S404). It is assumed that the threshold referred to here is set to 0 or less. The threshold may be set to 0, but a frequency of operating the processing may be reduced by setting the threshold to a negative value.

Here, in a case where it is determined that the correlation between the signal picked up by the FF microphone 102 and the signal picked up by the FB microphone 106 exceeds the predetermined threshold (No in step S404), a situation is assumed in which an external sound leaking into the NC region 101 is picked up by the FF microphone 102 and is canceled by an FF cancellation signal, and further a remaining external sound is canceled by an FB cancellation signal. In this case, next step S405 is skipped. Then, until a condition for ending the noise canceling processing is satisfied (No in step S406), the processing returns to step S402 and the processing described above is repeatedly executed.

On the other hand, in a case where it is determined that the correlation between the signal picked up by the FF microphone 102 and the signal picked up by the FB microphone 106 is equal to or less than the predetermined threshold (Yes in step S404), it is assumed that the FF microphone 102 picks up a sound that does not leak into the NC region 101. In this case, the processing proceeds to the next step S405, and generation processing of the cancellation signal by the noise canceling processing unit 301 is stopped or output of the generated cancellation signal is stopped, or output of the cancellation signal is reduced for a certain period of time. With this arrangement, it is possible to prevent a wearer of headphones from feeling discomfort caused by directly listening to the FF cancellation signal and discomfort that remains even if the FF cancellation signal and the FB cancellation signal are synthesized from each other.

Then, until the condition for ending the noise canceling processing is satisfied (No in step S406), the processing returns to step S402 and the processing described above is repeatedly executed.

Note that a negative correlation between the sound pickup signal of the FF microphone 102 and the sound pickup signal of the FB microphone 106 means that there is a possibility that an event that adversely affects operation of the noise canceling (a wind, a contact of a finger or hair, etc.) has occurred. Therefore, the noise canceling control unit 304 may notify the wearer of the headphones that there is a possibility that a bad event has occurred through audio guidance output from the reproduction unit 104 or a user interface (UI) of another device such as a smartphone.

Figure 5:
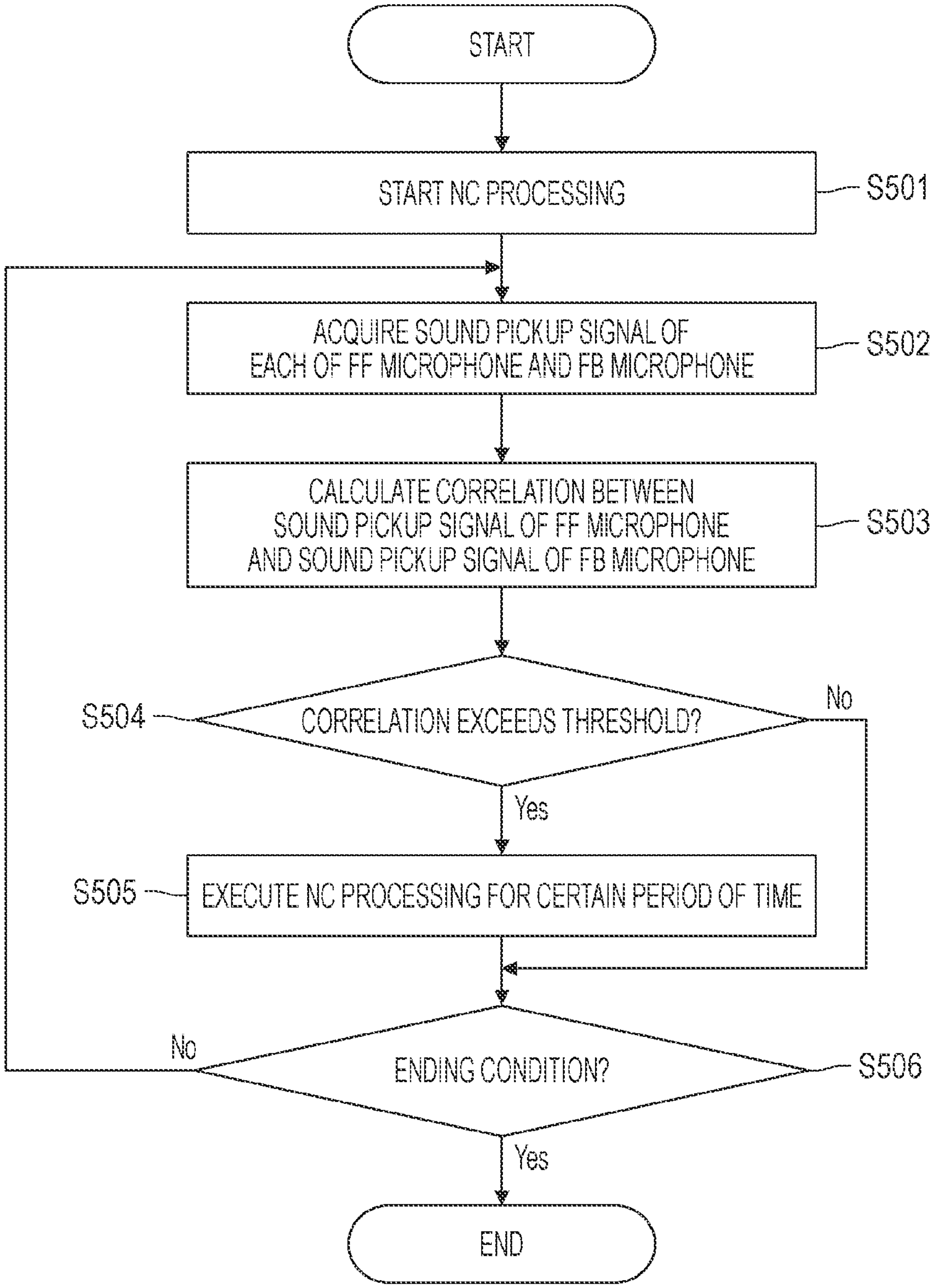
FIG. 5 is a flowchart illustrating another processing procedure for noise canceling performed in the noise canceling system 100.

FIG. 5 illustrates another processing procedure for noise canceling performed in the noise canceling system 100 having the functional configuration illustrated in FIG. 3 in the form of a flowchart.

When noise canceling processing is started in the noise canceling system 100 (step S501), first, a sound pickup signal of each of the FF microphone 102 and the FB microphone 106 is acquired (step S502).

Next, the correlation calculation unit 302 calculates a correlation between the signal picked up by the FF microphone 102 and the signal picked up by the FB microphone 106 (step S503). Note that the correlation calculation unit 302 may perform signal processing for reducing an influence of a music signal, such as a low-pass filter or music cancellation, before the correlation calculation.

Then, the correlation determination unit 303 checks whether the correlation between the signal picked up by the FF microphone 102 and the signal picked up by the FB microphone 106 exceeds a predetermined threshold (step S504). It is assumed that the threshold referred to here is set to 0 or less. The threshold may be set to 0, but a frequency of operating the processing may be reduced by setting the threshold to a negative value.

Here, in a case where it is determined that the correlation between the signal picked up by the FF microphone 102 and the signal picked up by the FB microphone 106 is equal to or less than the predetermined threshold (No in step S504), it is assumed that the FF microphone 102 picks up a sound that does not leak into the NC region 101. In this case, next step S505 is skipped. Then, until a condition for ending the noise canceling processing is satisfied (No in step S506), the processing returns to step S502 and the processing described above is repeatedly executed.

Note that a negative correlation between the sound pickup signal of the FF microphone 102 and the sound pickup signal of the FB microphone 106 means that there is a possibility that an event that adversely affects operation of the noise canceling (a wind, a contact of a finger or hair, etc.) has occurred. Therefore, the noise canceling control unit 304 may notify a wearer of headphones that there is a possibility that a bad event has occurred through audio guidance output from the reproduction unit 104 or a UI of another device such as a smartphone.

On the other hand, in a case where it is determined that the correlation between the signal picked up by the FF microphone 102 and the signal picked up by the FB microphone 106 exceeds the predetermined threshold (Yes in step S504), a situation is assumed in which an external sound leaking into the NC region 101 is picked up by the FF microphone 102 and is canceled by an FF cancellation signal, and further a remaining external sound is canceled by an FB cancellation signal. In this case, the processing proceeds to the next step S505, and generation processing of the cancellation signal by the noise canceling processing unit 301 is executed, and the generated cancellation signal is output for a certain period of time. At that time, the cancellation signal may be enhanced according to magnitude of the correlation between the sound pickup signal of the FF microphone 601 and the sound pickup signal of the FB microphone, or algorithm of the noise canceling processing may be switched according to the magnitude of the correlation.

Then, until the condition for ending the noise canceling processing is satisfied (No in step S506), the processing returns to step S502 and the processing described above is repeatedly executed.

Note that, as a modification of the noise canceling system 100 illustrated in FIG. 1, the reproduction unit 104 may not be provided. In this case, the FF cancellation signal generated on the basis of the sound pickup signal of the FF microphone 102 may not be audio-output, and a correlation between a superimposed signal obtained by superimposing the FF cancellation signal on the sound pickup signal of the FB microphone 106 and the sound pickup signal of the FF microphone 102 may be calculated. At that time, the FF cancellation signal may be directly superimposed on the sound pickup signal of the FB microphone 106, or may be superimposed after predetermined signal processing is performed on the FF cancellation signal. The predetermined signal processing mentioned here may be, for example, conversion processing from an original signal to a signal picked up by the FB microphone 106 when a certain signal is audio-output from the reproduction unit 104 and picked up by the FB microphone 106.

Furthermore, although only one FF microphone 102 and one FB microphone 106 are illustrated in FIG. 1 for simplification of the drawing, at least one of the FF microphone 102 or the FB microphone 106 may include a plurality of sound pickup elements such as a microphone array.

According to the first embodiment, since unnecessary or harmful noise canceling processing is suppressed, discomfort of the wearer of the headphones can be reduced.

Embodiment 2

The first embodiment related to the noise canceling system in which the feedforward method and the feedback method are combined and the noise canceling is controlled on the basis of the correlation between the sound pickup signal of the FF microphone and the sound pickup signal of the FB microphone has been described above.

As described above, if the FF microphone picks up the sound that does not leak into the NC region, the sound pickup signal of the FF microphone and the sound pickup signal of the FB microphone have a negative correlation. In the first embodiment, the noise canceling system in which the feedforward method and the feedback method are combined and the noise canceling is controlled on the basis of the correlation between the sound pickup signal of the FF microphone and the sound pickup signal of the FB microphone has been described.

For example, if a large sound due to turbulence is generated on the surface and inside of the FF microphone due to a strong wind, the sound pickup signal of the FF microphone and the sound pickup signal of the FB microphone have a negative correlation. Furthermore, even if a finger, hair, or the like comes into contact with the FF microphone, only the FF microphone picks up the contact sound, so that the sound pickup signal of the FF microphone and the sound pickup signal of the FB microphone have a negative correlation. Therefore, wind detection and contact detection can be performed on the basis of the correlation between the sound pickup signal of the FF microphone and the sound pickup signal of the FB microphone.

Therefore, as a second embodiment, a device control system that performs device control by utilizing a determination result of a correlation between a sound pickup signal of an FF microphone and a sound pickup signal of an FB microphone as operation information via a UI or the like will be described. Examples of the device control include start, stop, pause, fast forward, rewind, and volume adjustment of music reproduction in a music reproduction device.

Figure 6:
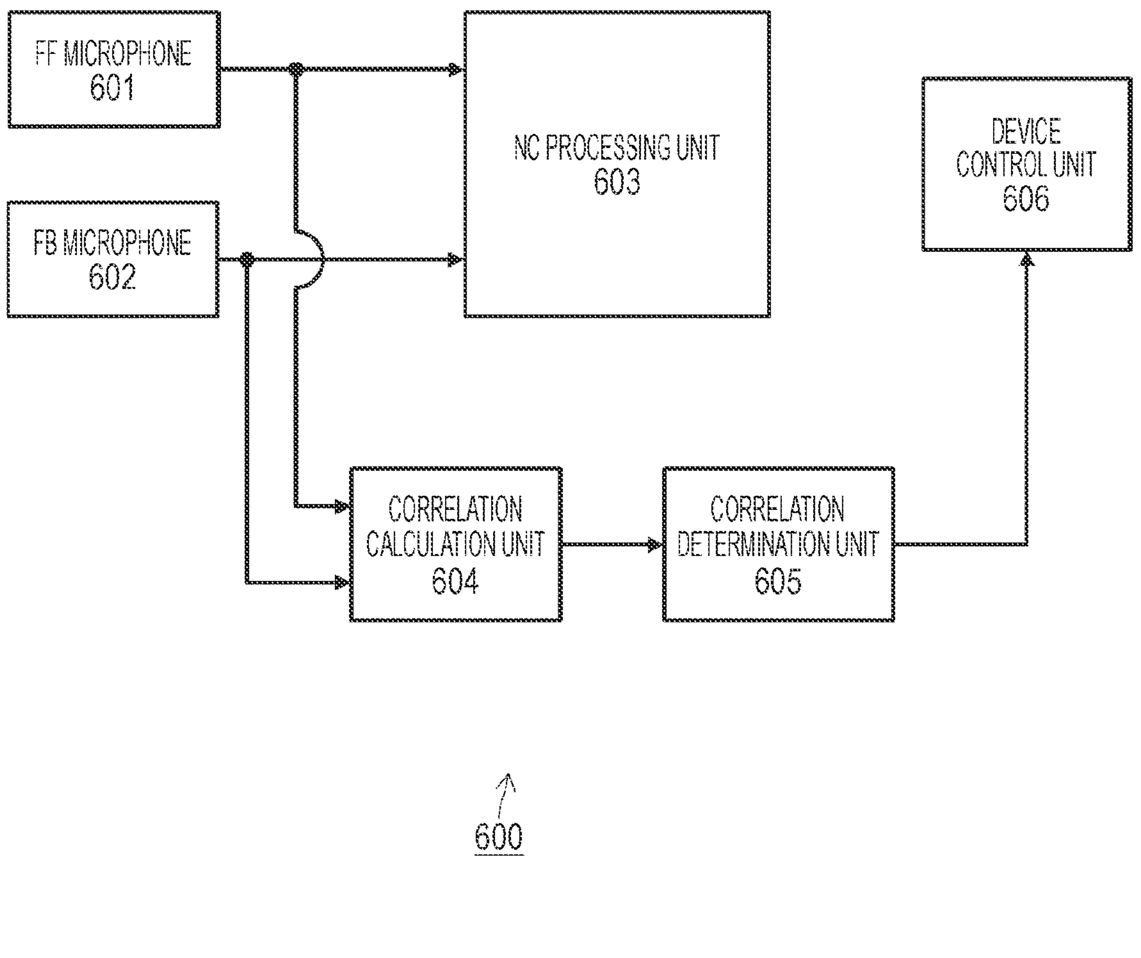
FIG. 6 is a diagram illustrating a configuration example of a device control system 600.

FIG. 6 schematically illustrates a configuration example of a device control system 600 according to the second embodiment. However, the device control system 600 may be incorporated in the noise canceling system 100 applied to, for example, audio headphones or earphones.

The device control system 600 includes an FF microphone 601 installed outside an NC region (not illustrated in FIG. 6), an FB microphone 602 installed in the NC region, a noise canceling processing unit 603, a correlation calculation unit 604, a correlation determination unit 605, and a control unit 606.

The noise canceling processing unit 603 generates an FF cancellation signal for canceling an external sound leaking into the NC region on the basis of a sound pickup signal of the FF microphone 601, and generates an FB cancellation signal for canceling a sound left uncanceled by the FF cancellation signal on the basis of a sound pickup signal of the FB microphone 602.

The correlation calculation unit 604 calculates a correlation between a signal picked up by the FF microphone 601 and a signal picked up by the FB microphone 602. A method for calculating the correlation between the two signals is not particularly limited. The correlation calculation unit 604 may calculate the correlation using, for example, any of an inner product value, a Pearson's correlation coefficient, or a cosine similarity.

The correlation determination unit 605 determines a correlation between a signal picked up by the FF microphone 601 and a signal picked up by the FB microphone 602. Similarly to the first embodiment, in a case where an external sound leaking into the NC region is picked up by the FF microphone 601 and is canceled by the FF cancellation signal, and a remaining external sound is canceled by the FB cancellation signal, the correlation between the signal picked up by the FF microphone 601 and the signal picked up by the FB microphone 602 is positive or 0. On the other hand, in a case where the FF microphone 601 picks up a sound that does not leak into the NC region, the correlation is negative. Therefore, the correlation determination unit 605 sets a threshold of 0 or less, and determines that the FF microphone 601 has picked up a sound of turbulence due to a strong wind or a contact sound of a finger or hair if the correlation falls below the threshold.

The control unit 606 converts a determination result by the correlation determination unit 605 into operation information via a UI or the like, and performs device control. The device mentioned here is, for example, a music reproduction device that transmits a music signal to headphones equipped with the device control system 600. Furthermore, examples of the device control include start, stop, pause, fast forward, rewind, and volume adjustment of music reproduction in the music reproduction device.

For example, a plurality of types of UI operations can be expressed according to magnitude of a contact sound on a surface of the FF microphone 601 and the number of contacts. Furthermore, in a case where the FF microphone 601 includes a plurality of sound pickup elements arranged in a line shape or a two-dimensional array shape, it is possible to express a UI operation including information of a position touched by a finger.

Note that the correlation calculation unit 604, the correlation determination unit 605, and the control unit 606 may be realized by an artificial intelligence function using a neural network. In such a case, a correlation between the sound pickup signal of the FF microphone 601 and the sound pickup signal of the FB microphone 602 and device control information is learned in advance by the neural network, and this neural network outputs appropriate device control information when the sound pickup signal of the FF microphone 601 and the sound pickup signal of the FB microphone 602 are input.

Figure 7:
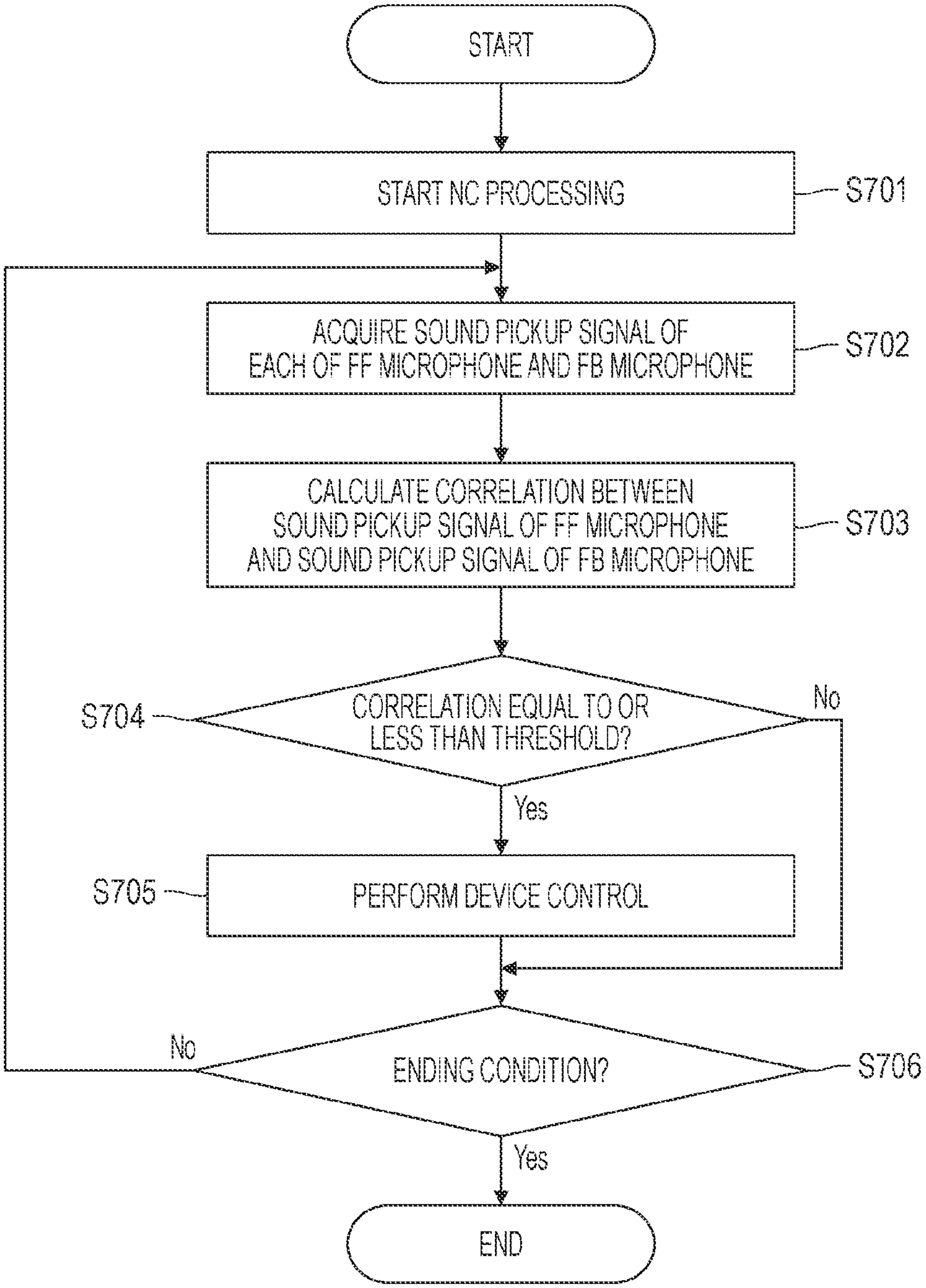
FIG. 7 is a flowchart illustrating a processing procedure for device control performed in the device control system 600.

FIG. 7 illustrates a processing procedure for noise canceling performed in the device control system 600 illustrated in FIG. 6 in the form of a flowchart.

When noise canceling processing is started in the device control system 600 (step S701), first, a sound pickup signal of each of the FF microphone 601 and the FB microphone 602 is acquired (step S702).

Next, the correlation calculation unit 604 calculates a correlation between the signal picked up by the FF microphone 601 and the signal picked up by the FB microphone 602 (step S703). Note that the correlation calculation unit 604 may perform signal processing for reducing an influence of a music signal, such as a low-pass filter or music cancellation, before the correlation calculation.

Then, the correlation determination unit 605 checks whether the correlation between the signal picked up by the FF microphone 601 and the signal picked up by the FB microphone 602 is equal to or less than a predetermined threshold (step S704). It is assumed that the threshold referred to here is set to 0 or less.

Here, in a case where it is determined that the correlation between the signal picked up by the FF microphone 601 and the signal picked up by the FB microphone 602 exceeds the predetermined threshold (No in step S704), a situation is assumed in which an external sound leaking into the NC region is picked up by the FF microphone 601 and is canceled by an FF cancellation signal, and further a remaining external sound is canceled by an FB cancellation signal. In this case, next step S705 is skipped. Then, until a condition for ending the noise canceling processing is satisfied (No in step S706), the processing returns to step S702 and the processing described above is repeatedly executed.

On the other hand, in a case where it is determined that the correlation between the signal picked up by the FF microphone 601 and the signal picked up by the FB microphone 602 is equal to or less than the predetermined threshold (Yes in step S704), it is assumed that a UI operation of contacting the surface of the FF microphone 601 is performed. In this case, the processing proceeds to next step S705, and the control unit 606 performs device operation on the basis of the determination result.

The device mentioned here is, for example, a music reproduction device that transmits a music signal to headphones equipped with the device control system 600. Furthermore, examples of the device control include start, stop, pause, fast forward, rewind, and volume adjustment of music reproduction in the music reproduction device. For example, a plurality of types of UI operations can be expressed according to magnitude of a contact sound on the surface of the FF microphone 601 and the number of contacts. Furthermore, in a case where the FF microphone 601 includes a plurality of sound pickup elements arranged in a line shape or a two-dimensional array shape, it is possible to express a UI operation including information of a position touched by a finger.

Then, after the device control corresponding to the operation on the FF microphone 601 is performed, the processing returns to step 702 and the processing described above is repeatedly executed until a condition for ending the noise canceling processing is satisfied (No in step S706)

According to the second embodiment, the FF microphone 601 can also be used as a touch sensor or a wind sensor.

INDUSTRIAL APPLICABILITY

The technology according to the present disclosure has been described above in detail with reference to the specific embodiments. However, it is self-evident that a person skilled in the art can modify or substitute the embodiments without departing from the gist of the technology according to the present disclosure.

The technology according to the present disclosure can be applied to, for example, audio headphones and earphones. Of course, the technology according to the present disclosure can be applied to various other fields in which it is necessary to remove an external sound leaking into a specific region.

In short, the technology according to the present disclosure has been described in the form of an example, and the contents of the present specification should not be interpreted in a limited manner. The scope of the claims should be considered in order to determine the gist of the technology according to the present disclosure.

Note that the technology according to the present disclosure can also have the following configurations.

(1) A signal processing device including:

a correlation calculation unit that calculates a correlation between a first sound pickup signal by a first microphone installed outside a predetermined region and a second sound pickup signal by a second microphone installed in the predetermined region;

a determination unit that determines the correlation; and a control unit that performs control based on a result of the determination.

(2) The signal processing device according to (1) described above, further including:

a processing unit that performs signal processing for generating a cancellation signal to be output in the predetermined region on the basis of the first sound pickup signal and the second sound pickup signal, in which the control unit controls execution of generation processing of the cancellation signal by the processing unit or output of the generated cancellation signal on the basis of the result of the determination.

(3) The signal processing device according to (2) described above, in which the processing unit generates a first cancellation signal for canceling an external sound leaking into the predetermined region on the basis of the first sound pickup signal, and generates a second cancellation signal for canceling a sound left uncanceled by the first cancellation signal on the basis of the second sound pickup signal.

(4) The signal processing device according to either (2) or (3) described above, in which the determination unit determines whether or not the correlation is equal to or less than a predetermined threshold, and in a case where it is determined that the correlation is equal to or less than the threshold, the control unit stops the generation processing of the cancellation signal by the processing unit or stops the output of the generated cancellation signal, or reduces the output of the cancellation signal.

(5) The signal processing device according to (4) described above, in which the threshold is set to 0 or less.

(6) The signal processing device according to either (2) or (3) described above, in which the determination unit determines whether or not the correlation exceeds a predetermined threshold, and in a case where it is determined that the correlation exceeds the threshold, the control unit performs the generation processing of the cancellation signal by the processing unit and causes to perform the output of the generated cancellation signal.

(7) The signal processing device according to (6) described above, in which the control unit switches algorithm by which the processing unit performs the generation processing of the cancellation signal according to magnitude of the correlation.

(8) The signal processing device according to any one of (1) to (7) described above, in which the correlation calculation unit calculates the correlation after applying a low-pass filter to the first sound pickup signal and the second sound pickup signal.

(9) The signal processing device according to any one of (1) to (7) described above, in which the correlation calculation unit calculates the correlation after removing a component of a known signal from the second sound pickup signal.

(10) The signal processing device according to (1) described above, in which the control unit controls a predetermined device on the basis of the result of the determination.

(11) A signal processing method including:

a correlation calculation step of calculating a correlation between a first sound pickup signal by a first microphone installed outside a predetermined region and a second sound pickup signal by a second microphone installed in the predetermined region;

a determination step of determining the correlation; and a control step of performing control based on a result of the determination.

(12) The signal processing method according to (11) described above, in which in the control step, execution of generation processing of a cancellation signal in the predetermined region based on the first sound pickup signal and the second sound pickup signal or output of the generated cancellation signal is controlled according to the result of the determination.

(13) A computer program described in a computer-readable form so that a computer functions as:

a correlation calculation unit that calculates a correlation between a first sound pickup signal by a first microphone installed outside a predetermined region and a second sound pickup signal by a second microphone installed in the predetermined region;

a determination unit that determines the correlation; and a control unit that performs control based on a result of the determination.

(14) A sound device including:

a first microphone installed outside a predetermined region;

a second microphone installed in the predetermined region;

a reproduction unit that outputs audio within the predetermined region;

a processing unit that performs signal processing for generating a cancellation signal to be output from the reproduction unit on the basis of a first sound pickup signal by the first microphone and a second sound pickup signal by the second microphone; and a control unit that controls execution of generation processing of the cancellation signal in the processing unit or output of the cancellation signal on the basis of a correlation between the first sound pickup signal and the second sound pickup signal.

(14-1) The sound device according to (14) described above, in which the processing unit generates a first cancellation signal for canceling an external sound leaking into the predetermined region on the basis of the first sound pickup signal, and generates a second cancellation signal for canceling a sound left uncanceled by the first cancellation signal on the basis of the second sound pickup signal.

(14-2) The sound device according to either (14) or (14-1) described above, in which it is determined whether or not the correlation is equal to or less than a predetermined threshold, and in a case where it is determined that the correlation is equal to or less than the threshold, the control unit stops the generation processing of the cancellation signal by the processing unit or stops the output of the generated cancellation signal, or reduces the output of the cancellation signal.

(14-3) The sound device according to either (14) or (14-1) described above, in which it is determined whether or not the correlation exceeds a predetermined threshold, and in a case where it is determined that the correlation exceeds the threshold, the control unit performs the generation processing of the cancellation signal by the processing unit and causes to perform the output of the generated cancellation signal.

(14-4) The sound device according to either (14) or (14-3) described above, in which the correlation calculation unit calculates the correlation after applying a low-pass filter to the first sound pickup signal and the second sound pickup signal.

(14-5) The sound device according to either (14) or (14-3) described above, in which the correlation calculation unit calculates the correlation after removing a component of a known signal from the second sound pickup signal.

REFERENCE SIGNS LIST

100 Noise canceling system
101 NC region
102 FF microphone
103 FF cancellation signal generation unit
104 Reproduction unit
105 Synthesis unit
106 FB microphone
107 FB cancellation signal generation unit
301 Noise canceling processing unit
302 Correlation calculation unit
303 Correlation determination unit
304 Noise canceling control unit
600 Device control system
601 FF microphone
602 FB microphone
603 Noise canceling processing unit
604 Correlation calculation unit
605 Correlation determination unit
606 Control unit

The invention claimed is:

1. A signal processing device, comprising:

a correlation calculation unit configured to calculate a correlation between a first sound pickup signal by a first microphone installed outside a specific region and a second sound pickup signal by a second microphone installed in the specific region, wherein the correlation is calculated based on application of a low-pass filter to the first sound pickup signal and the second sound pickup signal;

a determination unit configured to determine the correlation; and a control unit configured to perform control based on a result of the determination.

2. The signal processing device according to claim 1, further comprising:

a processing unit configured to perform signal processing to generate a cancellation signal to be output in the specific region based on the first sound pickup signal and the second sound pickup signal, wherein the control unit is further configured to control execution of generation processing of the cancellation signal by the processing unit or output of the generated cancellation signal based on the result of the determination.

3. The signal processing device according to claim 2, wherein the processing unit is further configured to:

generate a first cancellation signal to cancel an external sound that leaks into the specific region based on the first sound pickup signal; and generate a second cancellation signal to cancel a sound left uncanceled by the first cancellation signal based on the second sound pickup signal.

4. The signal processing device according to claim 2, wherein the determination unit is further configured to determine whether or not the correlation is equal to or less than a specific threshold, and based on the correlation is equal to or less than the specific threshold, the control unit is further configured to stop the generation processing of the cancellation signal by the processing unit or stop the output of the generated cancellation signal, or reduce the output of the cancellation signal.

5. The signal processing device according to claim 4, wherein the specific threshold is set to 0 or less.

6. The signal processing device according to claim 2, wherein the determination unit is further configured to determine whether or not the correlation exceeds a specific threshold, and based on the correlation exceeds the specific threshold, the control unit is further configured to perform the generation processing of the cancellation signal by the processing unit and cause to perform the output of the generated cancellation signal.

7. The signal processing device according to claim 6, wherein the control unit is further configured to switch algorithm by which the processing unit performs the generation processing of the cancellation signal according to magnitude of the correlation.

8. The signal processing device according to claim 1, wherein the correlation calculation unit is further configured to calculate the correlation after removal of a component of a known signal from the second sound pickup signal.

9. The signal processing device according to claim 1, wherein the control unit is further configured to control a specific device based on the result of the determination.

10. A signal processing method, comprising:

calculating a correlation between a first sound pickup signal by a first microphone installed outside a specific region and a second sound pickup signal by a second microphone installed in the specific region, wherein the correlation is calculated based on application of a low-pass filter to the first sound pickup signal and the second sound pickup signal;

determining the correlation; and performing control based on a result of the determination.

11. The signal processing method according to claim 10, wherein in the control step, execution of generation processing of a cancellation signal in the specific region based on the first sound pickup signal and the second sound pickup signal or output of the generated cancellation signal is controlled based on the result of the determination.

12. A non-transitory computer-readable medium having stored thereon, computer-executable instructions which, when executed by a computer, cause the computer to execute operations, the operations comprising:

calculating a correlation between a first sound pickup signal by a first microphone installed outside a specific region and a second sound pickup signal by a second microphone installed in the specific region, wherein the correlation is calculated based on application of a low-pass filter to the first sound pickup signal and the second sound pickup signal;

determining the correlation; and performing control based on a result of the determination.

13. A sound device, comprising:

a first microphone installed outside a specific region;

a second microphone installed in the specific region;

a reproduction unit configured to output audio within the specific region;

a processing unit configured to perform signal processing to generate a cancellation signal output from the reproduction unit based on a first sound pickup signal by the first microphone and a second sound pickup signal by the second microphone; and a control unit configured to control execution of generation processing of the cancellation signal in the processing unit or output of the cancellation signal based on a correlation between the first sound pickup signal and the second sound pickup signal, wherein the correlation is based on application of a low-pass filter to the first sound pickup signal and the second sound pickup signal.

* * * * *